May 13, 1952 W. H. CARTHEUSER 2,596,207

COMB

Filed June 14, 1948

2 SHEETS—SHEET 1

INVENTOR

WILLIAM H. CARTHEUSER

BY

ATTORNEY

May 13, 1952 W. H. CARTHEUSER 2,596,207

COMB

Filed June 14, 1948 2 SHEETS—SHEET 2

INVENTOR

WILLIAM H. CARTHEUSER

BY [signature]

ATTORNEY

Patented May 13, 1952

2,596,207

UNITED STATES PATENT OFFICE 2,596,207

COMB

William H. Cartheuser, Sherman Oaks, Calif.

Application June 14, 1948, Serial No. 32,829

20 Claims. (Cl. 132—22)

The present invention relates to combs in general and particularly to an improved comb incorporating securing means by which it may be held against accidental displacement after being positioned in the hair. More specifically the invention comprises a dress comb of a type usually made of a synthetic material such as plastic, which may be ornamented or plain as desired, and which is provided with retractable elements normally extended transversely between the comb teeth in a manner to prevent displacement from the hair.

Combs may be classified broadly as dress combs and utility combs. The present invention relates to the first class, the members of which are usually positioned in a lady's hair to preserve its arrangement or for decorative reasons. In either case the intent is that it will remain until intentionally removed. Frequently the comb carries decorative ornaments which increase its weight and so its tendency to fall out. As the human hair offers but slight frictional resistance to the comb teeth a definite problem of providing security is presented. To increase their security some combs are provided with flexible teeth which frictionally abut one another and are adapted to clamp the hair. Such combs are in fact more secure than the ordinary straight toothed comb but have the handicap that they are less attractive and are more difficult to position.

Inherently the operation of positioning a comb in the hair is one not susceptible of convenient observation and so it is essential that the comb be simply constructed and easily manipulated. This requirement has heretofore prevented the provision of a completely satisfactory self-locking comb.

With an appreciation of the problems present and of the defects characterizing comb constructions heretofore known it is an object of the present invention to provide a new and improved self-locking comb.

It is another object of the invention to provide a new and improved self-locking comb with retractable locking elements.

Still another object of the invention is to provide an improved dress comb in which certain teeth of the comb incorporate laterally extending barbs which function to prevent displacement from the hair when in their operative positions and which may be retracted into inoperative position during the placing and removing operations.

A still further object of the invention is to provide a self-locking comb incorporating inherently resilient elements normally functioning as locking means and which are displaceable into inoperative position to permit of comb placement and displacement.

Still another object of the invention is to provide a comb in which certain of the teeth are provided with laterally displaceable elements, including barbs which reduce the space between adjacent teeth and engage hair positioned therebetween to prevent displacement.

These and other more specific objects will appear upon reading the following specification and claims and upon considering in connection therewith the attached drawings to which they relate.

Referring now to the drawings in which preferred embodiments of the invention are disclosed:

Figure 23:
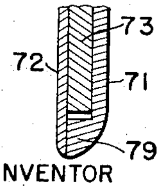
Figures 11, 12, 13, 14, 15, 16, 17, 18, 19, 20, 21, 22:
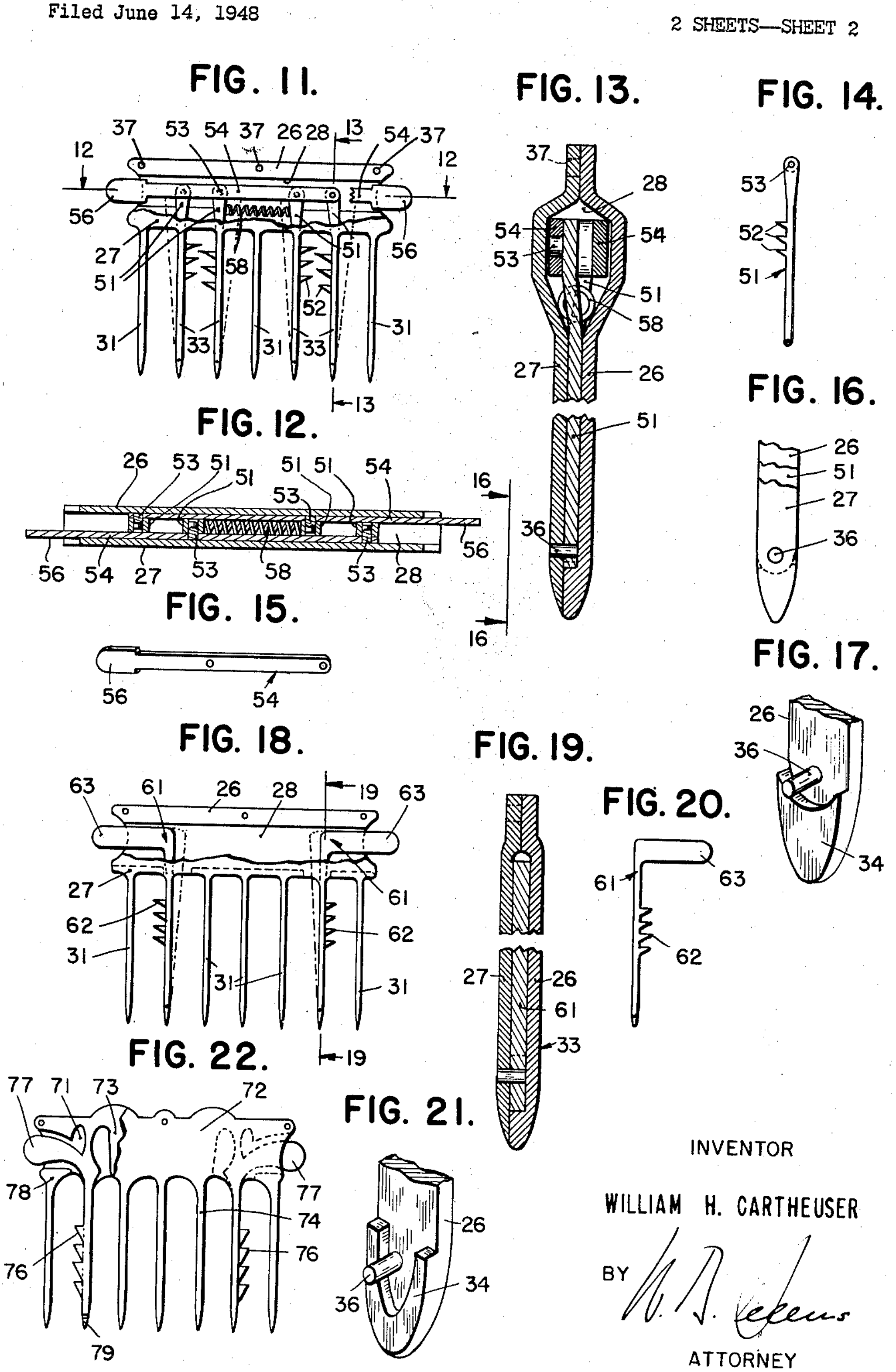
Figure 11 is a side elevational view of a second preferred embodiment of the present invention with certain parts broken away.
Figure 12 is a longitudinal section through the back upon the line 12—12 of Figure 11.
Figure 13 is a vertical section through one of the teeth including securing means, being taken upon the line 13—13 of Figure 11.

Figure 14 comprises side views of one of the pivoted securing elements;

Figure 15 is a view of one of the laterally displaceable actuating arms of a securing unit;

Figure 16 is a partial view of the lower end of a tooth including a securing element looking in the direction of the arrows upon the line 16—16 of Figure 13;

Figure 17 is a perspective view of the lower end of one of the sides or faces of the tooth of Figures 13 and 16;

Figure 18 is a side elevational view, with part of the back broken away, of a third preferred embodiment of the invention;

Figure 19 is a vertical section upon the line 19—19 of Figure 18;

Fig. 20 is a side elevational view of a securing unit provided in the embodiment illustrated in Figures 18 and 19;

Figure 21 is a perspective view of the extreme lower end of one of the side faces of the tooth illustrated in Figure 19;

Figure 22 is a side view, with certain parts broken away, of a fourth preferred embodiment of the invention; and Figure 23 is a partial longitudinal section through one of the teeth shown in Figure 22 which includes a movable element.

Figure 1:
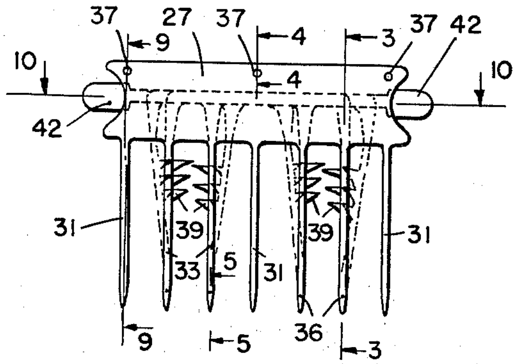
Figure 1 is a view in side elevation of a comb constructed in accordance with the first preferred embodiment of the invention.
Figure 2:
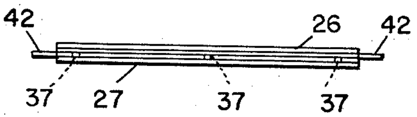
Figure 2 is a top view of the comb of Figure 1.
Figure 10:
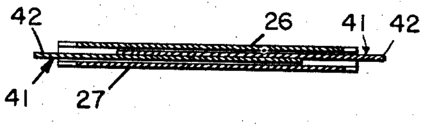
Figure 10 is a longitudinal transverse section upon the line 10—10 of Figure 1 illustrating the arrangement of parts within the comb back.
Figures 7, 8:
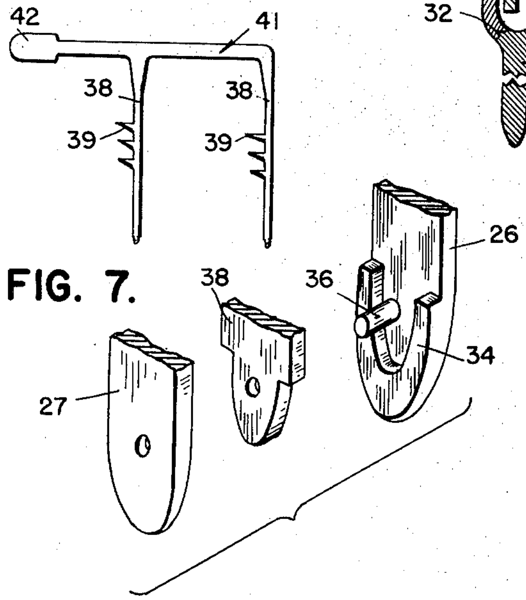
Figure 7 is an exploded view of the lower end of the comb tooth shown in Figures 5 and 6.
Figure 8 is a side elevational view of one of the manually operable securing units.
Figure 3:
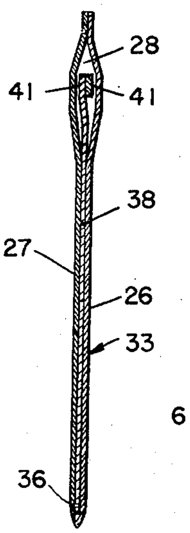
Figure 3 is a vertical section upon the line 3—3 of Figure 1 showing the construction of one of the teeth incorporating laterally displaceable means.
Figure 9:
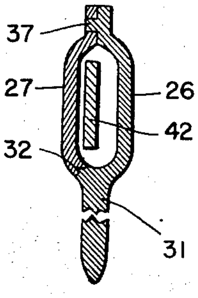
Figure 9 is a section upon the line 9—9 of Figure 1 through one of the teeth without movable parts.
Figure 4:
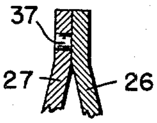
Figure 4 is an enlarged section upon the line 4—4 of Figure 1 showing the interengaging means incorporated in the comb back.
Figure 5:
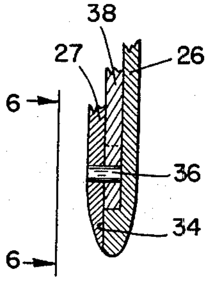
Figure 5 is an enlarged section upon the line 5—5 of Figure 1 illustrating the construction of a tooth incorporating locking means.
Figure 6:
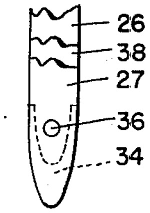
Figure 6 is a front view of the tooth portion illustrated in section in Figure 5.

Referring again to the drawings, and to Figures 1 to 10, inclusive, illustrating the first preferred embodiment of the invention, a comb constructed in accordance with the invention is seen to comprise a pair of outside face or side members, or sections, which are substantially alike in their general contour and configuration. However, this need not be the case so long as they are capable of establishing certain fundamental relationships by their mutual cooperation. These members, indicated by the reference characters 26 and 27, may be formed of suitable material such as plastic of the type now available commercially upon the American market, and each is seen to include a multiplicity of integral parallel and/or teeth-forming extensions and a slightly concave upper portion. The concave portions cooperate in the manner illustrated clearly in Figures 3 and 9 to provide a longitudinally extending housing or back 28. Certain of the teeth, those indicated by the reference character 31 in Figure 1, are formed integrally upon the member 26, the member 27 connecting thereto in tongue and groove relationship, as indicated at 32 in Figure 9. The remaining teeth, those bearing the reference character 33, have a thickness equal to that of the teeth 31, but are formed by both side members 26 and 27, the tooth-forming portions of which are spaced by an abutment shoulder 34 formed integrally at the lower end of the tooth portons of member 26. As is shown most clearly in Figure 5, the tooth-forming portion of member 27 abuts the shoulder 34 and is spaced by it from its counterpart on the member 26 in each instance. In the case of tooth 33 a pin 36 is formed integrally on the lower end of each of the tooth extensions of the side member 26 and extends through the opposed tooth section of the member 27. The end of the pin 36 may be expanded or overturned in a conventional manner to provide a locking relationship not shown. Similar retaining pins 37 carried by member 26 secure the side members together adjacent the upper edge of the housing 28.

The hollow back or housing 28 formed by the side members 26 and 27 opens directly to the space between the sides of the teeth 33. Positioned within, and forming a part of each of those teeth, with its lower end fixedly seating inside the shoulder 34 and traversed by the securing pin 36, and with its upper end extended into the housing 28, is a resilient, flexible, movable securing element 38 formed along one side with outwardly or laterally projecting points, barbs, or projections 39. In this embodiment it is to be noted that the teeth 33 are arranged in pairs and that the barbs 39 in the adjacent teeth 33 project toward one another in slightly displaced and substantially intermeshing relationship. Each of the movable securing or locking elements 38 connects at its upper end within housing 28 to a manually operable actuating bar 41, in fact the bar and the elements are preferably made integrally in this embodiment. While each of the securing or locking elements 38 is connected to an actuating bar 41, they are not all connected to the same bar, it is to be noted. Those elements in which the barbs 39 point toward the left, as viewed in Figures 1 and 8, connect to an actuating bar 41 which itself extends to the left and through the housing 28 with its enlarged end or head 42 extending therefrom. Similarly, those elements carrying barbs extending to the right are connected to an actuating bar projecting to the right of the housing.

The securing or locking unit, a term which may be applied in each instance to the movable securing elements 38 and the actuating bar 41 connected thereto, may be made of a plastic similar to that used for the exterior body members 26 and 27, if desired, or it may be made of different material. It is only critical that it have sufficient flexibility and resilience that with the lower ends of the elements 38 secured in the seats formed by the shoulders 34 and by the pins 36, that it can be displaced by a force applied to the heads 42 at the end of the bars 41 as to move the barbs 39 from their exposed position between the teeth to retracted positions in which they are covered by the side faces provided by the members 26 and 27. The barbs may then be said to be retracted within the teeth themselves, and when so retracted are disengaged from hair positioned between the teeth. Obviously, simultaneous forces applied to the heads 42 of the bars 41 at the opposite ends of the housing 28 will effect the flexure, substantially equivalent to a pivotal movement, of all the securing elements 38 and the simultaneous retraction of all of the barbs 39.

The use and operation of the comb constructed in accordance with the first preferred embodiment of the invention is believed to be clear from the foregoing. It being desired to position the comb, the user would place it in the hair while exerting oppositely directed forces upon the heads 42 of the securing units at the opposite ends of the housing 28. Depending upon the size and shape of the comb, and in this connection the particular size or curvature or proportion is not important, the thumb and forefinger, or thumb and middle finger may be used. The barbs 39 being in their retracted protected position would offer no interference to the seating of the teeth 33. Upon the comb being positioned the pressure upon the heads 42 is removed and, under the inherent resilience of the elements 38, those members return to their normal aligned position in the teeth 33, thereby projecting the barbs 39 to their operative positions illustrated in Figure 1 in which they engage and thread through the hairs extending between those teeth. A looking securing engagement is thus obtained which protects the comb against accidental displacement. It being desired to remove the comb, the same operation is followed, the force again being exerted upon the heads 42 and the comb removed while the pressure is so exerted.

Referring now to Figures 11 to 17, inclusive, the second preferred embodiment of the invention is illustrated which may be said to be broadly similar to the first described embodiment except as specified. In place of the securing units of the first embodiment in which the flexible resilient securing elements 38 were integral with their actuating bar 41, in the present construction the securing elements 51 are rigid. They are provided with barbs 52 and each is mounted for limited pivotal movement at its lower end, through seating pivotally upon the pin 36, and at its upper end through being pivotally connected by an integral pin 53 to the transversely extending actuating bar 54. The latter, in the manner of the bar 41 of the first embodiment, is provided with an enlarged operating head or end 56. In the absence of the inherent resiliency which characterized the securing arms 38 of the first embodiment, it is necessary in the present construction to provide a spring force to return the securing units to their normal or operative positions. This force is provided by a spring 58 which is seen to be of the coil type and to extend between the upper ends of the inner elements 51 of the pair of securing units. Spring 58 functions to force the contacted arms 51 to their operative position and in doing so also positions the connected actuating arm 54 and through it the remaining connected elements 51. While the illustrated embodiment includes two securing elements or arms 51 in each securing unit it is to be understood that this number has been selected for illustrative purposes only and may be varied as desired.

Referring now to Figures 18 to 21, inclusive, a third preferred embodiment of the invention is illustrated which is basically similar to the first two embodiments although somewhat simpler. The securing unit in the present instance comprises but a single securing element 61 formed with barbs 62 and with an integral actuating head 63. The lower end of element 61 is fixedly secured against angular displacement between the tooth-forming extensions of members 26 and 27 as in the first embodiment and reliance is placed upon the inherent resilience of the material to return the unit from an inoperative position, to which it may be forced laterally as in the preceding forms, to its operative position. The interlocking jaw action characterizing the first two embodiments is not present in this simpler form.

Referring now to the construction of Figures 22 and 23 in particular, still another form of the invention is illustrated. Here the exterior side members 71 and 72, as in the preceding embodiments, form the sides of the comb back or head portion and of all depending teeth, of which seven are provided in the illustrated embodiment, and are fixedly related. A central element 73 is positioned between members 71 and 72 and is provided with a head portion conforming in part to the shape of side members 71 and 72 and fixed therebetween. The three centrally located teeth 74 of the comb are rigid, except for their inherent flexibility, and are formed of integral tooth-forming portions of side members 71, 72 and central member 73 which in effect constitute plies of the teeth.

The teeth upon both sides of the central teeth 74 are differently constituted and are formed of the tooth-forming portions of side members 71 and 72, identical to those of teeth 74, and by a movable barbed carrying element 76 integral with central element 73 and flexibly connected so that it is in effect pivotally mounted for movement toward and from adjacent teeth. To space the tooth-forming portions of members 71 and 72 to permit free unhindered movement of element 76 supplemental filler piece 79, integral with one of the members 71 and 72 if preferred, are positioned between their tips and fixedly secured.

The outer teeth of the unit are formed of integral tooth-forming extensions of side members 71 and 72 fixedly secured to a filler element 78 similarly shaped and sandwiched therebetween.

This fourth embodiment of the invention is operated in the manner of the preceding embodiments by a longitudinal pressure upon the extended head members 77. The securing elements 76 flex under this pressure about their connection with the main filler member 73, of which they are an integral part. The pivotal action, it is to be noted, is at the upper end of the teeth and not at the lower as in the preceding embodiments. With the elements 76 so flexed the barbs formed thereon are withdrawn to inoperative non-obstructive positions between the side member of the tooth of which they are a part. The return to operative position takes place under the natural resilience of the element 76 itself.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a comb of the type comprising a back and a plurality of teeth extended therefrom at least one of said teeth including a movable element fixed to the end of said one tooth, means to secure said teeth relative to hair extended therebetween comprising a lateral projection extending from said movable element toward an adjacent tooth, said element being movable with respect to said one tooth to move said lateral projection between extended and retracted positions with respect to said tooth, and manually operable means to retract said projection within said one tooth to an inoperative position by moving said movable element about the end of said one tooth.

2. In a comb of the type comprising a back and a plurality of teeth extended therefrom at least one of said teeth including a movable element fixed to the end of said one tooth, means to secure said teeth relative to hair extended therebetween comprising a plurality of lateral projections carried by said movable element and normally extended toward an adjacent tooth, and manually operable means to move said movable element about the end of said one tooth to move said projections laterally relative to said one tooth and into a position in which the spaces between said projections are protected by said one tooth to prevent said projections from engaging hair positioned between said teeth.

3. In a comb of the type comprising a back and a plurality of teeth extended therefrom, means to secure said teeth relative to hair extended therebetween comprising a movable element extended lengthwise and interiorly of one of said teeth, fixed to the end thereof, and formed with a projection extended laterally toward an adjacent tooth, and means to move said element to move the end of said projection into protective juxtaposition to said one tooth.

4. The construction recited in claim 3 characterized in that said movable element is pivoted to said one tooth adjacent its outer end.

5. The construction recited in claim 3 characterized in that said means to move said element are positioned in said back.

6. The construction recited in claim 3 characterized in that said movable element comprises a resilient flexible member fixedly connected at its end to the end of said one tooth and in that said means to move said element is connected thereto in said back and is extended from said back into position to be actuated by the user.

7. The construction recited in claim 6 characterized in that said movable element and said means to move said element are integral and in that said means extend from the end of said back.

8. In a comb of the type comprising a back and a plurality of teeth extended therefrom, means to secure said teeth relative to hair extended therebetween comprising movable elements fixed to the ends of said teeth and having lateral projections extending in opposite directions on adjacent teeth as to engage hair positioned therebetween, and means to move said movable elements about their points of connection to said teeth to retract said projections relative to the teeth by which they are carried to disengage said hair.

9. The construction recited in claim 8 characterized in that said projections on adjacent teeth are interspaced.

10. The construction recited in claim 9 characterized in that said means to retract said projections include actuating means positioned in said back and projecting into operable positions at the opposite ends thereof.

11. In a comb of the type comprising a back and a plurality of teeth extended therefrom, certain of said teeth including an inherently resilient element fixed to their ends, each of said resilient elements being formed with a lateral projection extended toward an adjacent tooth to confine hair positioned therebetween, and manually operable means in and extended from said back to move said projection to a retracted position relative to said teeth in which it offers no opposition to the movement of hair between said teeth.

12. In a comb of the type comprising a back and a plurality of teeth extended therefrom, certain of said teeth including an element pivoted at its outer end to one of said teeth and formed with a lateral projection extended toward an adjacent tooth to confine hair positioned therebetween, a spring connected to said element to maintain resistingly said element in its operative position in which said projection extends at the side of said one tooth, and manually operable means to move said element to move said projection to a retracted position relative to said teeth in which it offers no opposition to the movement of hair between said teeth.

13. The construction defined in claim 12 characterized in that certain of said teeth include adjacent teeth and in that said spring is connected to a plurality of said elements.

14. In a comb of the type comprising a back and a plurality of teeth extended therefrom, certain of said teeth including an element pivoted at its outer end to one of said teeth and having lateral projections extended toward an adjacent tooth to confine hair positioned therebetween, a movable actuating member carried by said back and pivotally connected to said pivoted element, and a resilient member exerting a force to move said projections into operative positions in which they extend at the side of said one tooth.

15. In a comb of the type comprising a back and a plurality of teeth extended therefrom, certain of said teeth including pivoted elements pivotally connected at their outer ends to said teeth having lateral projections extended toward projections positioned on adjacent teeth, a pair of laterally extending actuating members carried by said back pivotally connected to said elements, characterized in that adjacent projection-carrying elements are connected to different members of said pair of actuating members in order that movement of said members in opposite directions under oppositely directed forces effects the movement of said adjacent projection-carrying elements in opposite directions to move said projections toward or from each other.

16. The construction recited in claim 15 characterized in that spring means carried by said back exert forces on said members to position said projections in their operative positions in which they are extended between adjacent teeth.

17. The construction recited in claim 15 characterized in that said pair of actuating members are slidably carried by said back and are provided with spaced force-receiving portions upon which force may be exerted as the comb is lifted by the hand.

18. In a comb having a back and a plurality of teeth extended therefrom, one of said teeth including a movable element resiliently mounted in said back and provided with lateral projections extended at the side of the tooth of which it is a part, and actuating means connected to said element to receive a user-provided force to move said projections to inoperative position within said tooth.

19. In a comb having a back and a plurality of teeth extended therefrom, one of said teeth including an element extended longitudinally in one of said teeth and resiliently mounted within said back for deflection relative to said tooth, said element being formed with a projection extended laterally from said tooth to serve as an obstruction to the displacement of hair longitudinally of said tooth, and means extended from said element adjacent said back to pivot said element to move said projection to an inoperative position within said tooth.

20. A comb fabricated of complementary parts including a pair of outer side members and a central member spacing said side members, integral teeth-forming blanks integral with said members extended in parallel relationship to form teeth, certain of said blanks being fixedly secured together to provide solid teeth, the blank of said central member being laterally displaceable between the blanks of said side members in certain of the other teeth and formed with laterally extending barbs, and means connected to the blank of said central member and extended to the side of said blanks to provide a force-receiving portion by which said barbs may be moved to a retracted position.

WILLIAM H. CARTHEUSER.

REFERENCES CITED

The following references are of record in the file of this patent:

UNITED STATES PATENTS

| Number | Name | Date |
|---|---|---|
| 713,402 | Clinton | Nov. 11, 1902 |
| 842,733 | Watson | Jan. 29, 1907 |
| 999,596 | Scharer | Aug. 1, 1911 |
| 2,425,435 | McArthur | Aug. 12, 1947 |

FOREIGN PATENTS

| Number | Country | Date |
|---|---|---|
| 180,537 | Germany | June 3, 1906 |